United States Patent [19]

Pilz et al.

[11] Patent Number: 5,756,158
[45] Date of Patent: May 26, 1998

[54] METHOD OF PRODUCING A CORROSION-PROTECTIVE COATING ON ARTICLES OF OR CONTAINING BRONZE

[75] Inventors: Monika Pilz, Kleinrinderfeld; Hannelore Romich, Wurzburg, both of Germany

[73] Assignee: Fraunhofer-Gesellschaft zur Förderung der angewandten Forschung e.V., Munich, Germany

[21] Appl. No.: 701,511

[22] Filed: Aug. 22, 1996

[30] Foreign Application Priority Data

Aug. 22, 1995 [DE] Germany ............... 195 30 836.0

[51] Int. Cl.⁶ ............................................. B05D 7/14
[52] U.S. Cl. ............... 427/387; 427/388.2; 427/388.4; 427/388.5; 427/409
[58] Field of Search ................ 427/387, 409, 427/388.1, 388.2, 388.4, 388.5

[56] References Cited

U.S. PATENT DOCUMENTS 4,746,366  5/1988  Philipp et al. ............. 106/287.19

4,840,666  6/1989  Schmidt et al. ............. 106/14.05

FOREIGN PATENT DOCUMENTS

| | | |
|---|---|---|
| 3536716 | 4/1987 | Germany. |
| 3917535 | 12/1990 | Germany. |
| 4303570 | 8/1994 | Germany. |
| 9325605 | 12/1993 | WIPO. |

OTHER PUBLICATIONS

Translation of DE4303570, Aug. 1994.

Surface Treatments: Cleaning, Stabilization, and Coatings, Preprints, Nordic Group—Danish Section, XIII. Congress, Copenhagen, Sep. 7–11, 1994, pp. 193–201.

*Primary Examiner*—Erma Cameron
*Attorney, Agent, or Firm*—Greenblum & Bernstein P.L.C.

[57] ABSTRACT

The invention relates to a method of producing a corrosion protective coating on articles of or containing bronze, in which at least one protective coating, produced from a crosslinkable organofunctional hydrosilicon with a non-crosslinkable organofunctional hydrosilicon, is applied to the upper side of the article.

14 Claims, No Drawings

METHOD OF PRODUCING A CORROSION-PROTECTIVE COATING ON ARTICLES OF OR CONTAINING BRONZE

The invention relates to a method of producing a corrosion-protective coating on articles of or containing bronze, in which a protective coating made from a polycondensation product of organofunctional hydrosilicons is applied.

Artistic objects and cultural material which is set up in the open air suffers damage through time which is caused by environmental influences. Metal objects in particular, such for example as bronze monuments, reveal dense black encrustations of corrosion which give no clue to the previous usually green patina layer. It is above all the encrustations of dirt, laden with harmful material, which deposit on the surface of the objects, and lead to corrosion which involve a progressive loss of material. The cleaning of historic bronze sculptures thus becomes a frequent measure in the care of monuments. The development of protective concepts offers a promising opportunity for conservation and restoration, and thus counteracts this time- and labour-intensive outlay on care. By using long-term surface protective agents, which not only prevent rapid contamination and enable simpler cleaning, but also ensure additional anti-corrosion protection, the maintenance of metal objects is substantially simplified.

In the last thirty years, in addition to conventional waxes and oils, organic polymers have been used for conservation of metal objects in the open air; the utility of said polymers for this special application has been tested. The wide-ranging scope of requirements for such materials extends from good adhesion and impregnation properties and barrier effect against water vapour and harmful gases, through resistance to weathering and ageing and long-term anti-corrosion action, to removal (reversibility) after ageing.

Waxes and oils prove suitable only when used regularly. In maintenance of monuments it is recommended that cleaning and surface treatment be repeated at least once a year.

Organic polymers such as epoxy or acrylic resins which are produced on a large scale industrially, and have individually been utilised in practical conservation and restoration without appropriate modification in terms of their application, are characterised by their relatively short-term effectiveness. In particular, polyacrylates tend to yellowing and embrittlement with increasing age. This leads in part to large-area adhesion losses, so that in this case also the surface treatment has to be renewed at foreseeable intervals.

The product Incralac, specially developed for protecting bronze sculptures and commercially available in English-speaking countries, an acrylic resin containing benzotriazol (Paraloid B76, dissolved in toluol), has proved its effectiveness in laboratory tests. It was however necessary, in order to increase the efficiency (long-term protective effect) of this conservation system, to add the harmful (irritant) BTA (benzotriazol). Accordingly, this coating also reveals, viewed in the long term (at present up to 13 years) when used on large surface areas in the open, secondary darkening or blackening of the treated metal surface on exposed edges, where the application of paint, as expected, is thinner.

It is likewise known of coverings based on silicon resins that they rapidly lose effectiveness due to ageing processes, particularly when the artistic bronze object treated is exposed to relatively moist conditions (e.g. a fountain).

A protective system is known from DE 4 303 570, on the basis of inorganic-organic copolymers (ORMOCERs) manufactured in the sol-gel process and specially optimised for adhesion to glass surfaces. This ORMOCER when used dries at ambient temperature without an additional hardener, by evaporation of the solvent. What is involved here, as required in monument maintenance, is a removable (=reversible) coating, which dissolves in organic solvents. However, adequate protection is only achieved by the additional incorporation of inorganic barrier particles (glass flakes).

It is also known to use these ORMOCERs as a protective coating for bronze statues (Surface treatments: cleaning, stabilisation and coatings, Preprints, Copenhagen, 7-11.09.1994). According to this it is proposed to produce a protective coating with a special cross-linkable epoxy-functional alkoxysilane, i.e. with 3-glycidoxypropyltrimethoxysilane. It has however become apparent that these protective coatings still do not provide satisfactory properties as regards corrosion protection and in particular the reversibility of the protective coating.

The object of the present invention is therefore, proceeding from the prior art discussed above, to propose a method which enables production of an improved corrosion protection and improved reversibility of a coating.

This object is achieved by the characterising features of claim 1. The claims indicate advantageous further developments.

Thus it is proposed according to the invention to apply the protective coating according to a quite specific procedure.

In a first process step, a pre-condensate is produced from 30 to 40 mol % of a noncrosslinkable organofunctional hydrosilicon, with 60 to 70 mol % of a crosslinkable organofunctional hydrosilicon. The essential factor in the first process step is that the ranges defined above for the components quoted must be precisely observed. Due to the unusually high amount of the non-cross-linkable organofunctional hydrosilicon of the general formula I (network modifier) in proportion to the cross-linkable organofunctional hydrosilicon of the general formula II (network former), which lies in an approximate ratio of network former to network modifier of about 2:1, reversibility of the coating used as a conservation measure is ensured. Polymerisation of the organic groupings is thus prevented and in this way the degree of cross-linking of the resultant polymer network is reduced. Due to the combination of the organic hydrosilicons proposed according to the invention, the surface polarity of the copolymer could be kept low (hydrophobic properties, low wetting by moisture), and thus weather resistance and protection against corrosion was appreciably increased compared to previous protective coatings in prior art.

According to the invention, in the noncrosslinkable organofunctional hydrosilicons of the general formula:

$R^1$ is aryl, $X^1$=OH, Cl or alkoxy and p=1–3. It has become apparent that of the organofunctional hydrosilicons of the general formula I, diphenylsilanediol is preferable.

Further according to the invention, the crosslinkable organofunctional hydrosilicons have the general formula II:

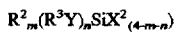

wherein:

$R^2$ is selected from the group consisting of alkyl, alkenyl, aryl, alkylaryl, arylalkyl, alkenylaryl, arylalkenyl;

$R^3$ is selected from the group consisting of alkylene, alkenylene, arylene, alkylarylene, arylalkylene, alkenylarylene, and arylalkenylene;

$R^2$ and $R^3$ can be interrupted by —O—, —S—, or —NH—;

$X^2$ is selected from the group consisting of H, halogen, hydroxy, alkoxy, acyloxy, and $NR^4$, where $R^4$ is H or alkyl;

Y is a polymerizable group; and m and n are whole numbers from 0 to 3, with m+n=1 to 3.

In the organofunctional hydrosilicon of the general formula II it is particularly preferred if the latter is an epoxy-functional hydrosilicon, in this case particularly preferably γglycidoxypropyltrimethoxysilane (GLYMO) or a methacrylate-functional hydrosilicon, here particularly preferably 3-methacryloxypropyltrimethoxysilane (MEMO). Particularly by means of the combination of GLYMO with arylsilanes such for example as diphenylsilanediol as a network converter it was possible, as already mentioned above, to keep the surface polarity of the copolymer extremely small.

The heteropolysiloxanes already pre-condensed during manufacture, particularly those from epoxy-functional hydrosilicons, especially the paints synthesised with γglycidoxypropyltrimethoxysilane, can be pre-polymerised in a controlled manner with an amine-based appropriate hardener, preferably an aminosilane-based appropriate hardener, which is added in a stoichiometric quantity (0.1–50 mol %) before application in a diluted, mixed coating solution. It has become apparent that in this case this hardener also acts as a catalyst. N-2-aminoethyl-3-aminopropyltriethoxysilane, diethylenetetramine or amino-propyltriethoxysilane is suitable as a hardener. The further build-up of the inorganic network is thus effected at ambient temperature, and the organic cross-linking also is, surprisingly, predominantly initiated at ambient temperature. In supplement, either in process step a) and/or b), up to 10 mol % of a cross-linking agent of the general formula III, $MR^5$, M=Si, Zr or Al and $R^5$=alkoxy, particularly methoxy or isopropoxy is added. In this way a controlled improvement in the network build-up is achieved.

In a further preferred embodiment, either at process step c) an organic oligomer is added, or after process step d), i.e., after application of the coating, at least one additional coating of an organic oligomer is applied Thus according to the invention it is possible to build up a protective system with the organic oligomer in a one-coat system, or in a multi-layer, preferably a two-coat system. The organic oligomer is preferably a copolymer of ethylene methacrylate and methyl acrylate. Such a product for example is commercially available under the title paraloid B72. The added organic oligomers serve in particular to stabilise the organic network. They also reduce the brittleness of the glass-like inorganic network. Thus, despite a surprisingly high protective action, a low degree of cross-linking is achieved, which is an important factor in the use of the protective coating according to the invention in the conservation field. The required reversibility of each conservation measure which becomes part of the history of a work of art, is thus ensured over a long period. The coatings can be removed again by organic solvents. In individual cases, as required, even more effective methods can be used. The fact that this combination of reversibility, practically relevant drying and hardening behaviour at ambient temperature and excellent resistance to ageing of the protective coating with at the same time very good conservation action for bronze substrates with a patina was possible, could not be derived from prior art, but appeared to be impossible in expert circles. The coatings according to the invention, in order to increase their mechanical strength and resilience, and in order to reduce the incidence of dust, can be combined with a second coating of an organic polymer which, due to the organic component of the coating according to the invention, has optimum potential for adhesion. The better resistance of the new system compared to organic polymers becomes apparent for example in the condensation test (no visual alteration in the coating).

The method according to the invention therefore comprises a novel protective idea for conservation of metal objects in the open air, and which is built up from inorganic-organic copolymers. Thus properties both of inorganic materials (good adhesion to inorganic substrate surfaces) and of organic materials (elasticity, reversibility) are unified. This class of material is based on a silicate network which is penetrated and thus modified by an additional organic polymer structure after hardening.

As the patina layer, consisting in bronze sculptures for example of basic copper sulphates and copper carbonates (brochantite, anthlerite, etc.) and also the bright metal surface, are frequently covered by a film of oxide, these surfaces offer optimum conditions for a covalent bond of the heteropolysiloxanes to be produced by the sol-gel method. This provides excellent adhesive strength, which has a positive effect (wet adhesion) for corrosion protection itself in hostile weather conditions or in the case of awkward sculptural shapes (e.g. because heavily stressed, curved or funnel-shaped). In the case of organic polymers or the other hand, the mechanism for adhesion to a metallic or patina surface is based purely on a physical keying of the overlayer. Under damp conditions, therefore, condensation occurs of the water vapour diffusing through the coating at the interface between coating and patina or metal, this condensation then in turn causing detachment of the coating over large areas.

The protective idea according to the invention can be applied e.g. with the aid of compressed-air spray apparatus to large areas of the bronze surface, or can be applied by a brush, e.g. to awkward sculptural shapes. The coating material can also be used, as explained above, with the addition of a special hardener (pot time about 7 days, depending on dilution), and then hardens after application at ambient temperature within 2 to 8 hours (depending on weather circumstances: moisture, temperature, wind strength) to provide a touch-dry corrosion protection treatment, which remains reversible by means of organic solvents even after numerous accelerated weathering cycles.

By means of the low viscosity of the solution according to the invention, which is diluted with high boiling-point solvents (e.g. butoxyethanol), and only pre-condensed during synthesis (small particle sizes in terms of distribution of molecular weight), an optimum penetrative capacity into the porous patina or metal (oxide) structure (open porosity in the case of cast bulky shapes) is made possible. Capillary attraction furthers the impregnation of the sculptural surface with the inorganic-organic coating material, which can penetrate as far as the metal-patina (or metal-oxide) interface. The chemical bond of the new protective system to the capillary walls prevents yielding of the material so that, after slow evaporation of the high boiling-point solvent, no cavities occur but a patina saturated with coating remains as a close sealant of the metal surface. Application of the coating may be repeated until the coating material fills the patina layer (occurrence of a wet effect).

The coating according to the invention can, as explained above, also be used as an efficient two-coat protective system on sites subject to high quantities of dust or severe mechanical stress. By means of combining two systems (protective coating—acrylic resin cover coating), a system applied as a first coating can provide the effective corrosion protection with optimum adhesion, while an acrylic resin free of benzotriazol used as a second coating (cover coating) ensures the mechanical load capacity of the conservation measure. Due to the varying reversal properties of both coating materials, it becomes possible to remove the second coating from the first, after damage (by scratches) or large-area detachment, by means of solvents, and to renew it (sacrificial coating) without losing the effective corrosion protection provided by the protective coating lying underneath.

The improved adhesive strength of the new protective idea for conservation of metal, compared to the commercially conventional organic polymers, has a particularly advantageous effect in long-term weathering tests. Whereas the organic polymer coatings at first show a comparably good adhesion on the metal surface to the inorganic-organic coating systems, with increasing age the adhesion of the coating according to the invention retains a surprising stability against environmental influences. Contrary to this, the adhesion of the organic coatings decreases rapidly. Embrittlement and consequent damage to these aged coatings involve large-area breakdowns of the coating, or migration underneath the coating due to progressive corrosion. Thus on the one hand, the conservation measures which must be continually repeated are costly, and on the other hand they are not feasible from the conservation standpoint, as regular interventions.

The new coating, while providing comparable protection for metals against liability to corrosion, thus also provides a longer-lasting protective effect, as the very good adhesion is retained during ageing. Damage to the coating is not increased in this case by subsequent consequential phenomena, so that renewed intervention by a necessary conservation measure can be delayed for long periods in the interests of the work of art. In simulation of conditions with extremely high moisture (condensation test, condensed moisture at high temperature) the new coating according to the invention appears highly stable and resistant. While the organic polymer coatings reveal not only a loss of adhesion but also an alteration in the visual appearance of the coating (clouding, milky deposit), the layers according to the invention remain unaltered in properties and appearance.

The invention will now be explained in more detail with reference to an example:

EMBODIMENT

The protective system forming the example is based on paints produced in the following reaction steps:
(I) pre-condensation of
  30–40 mol % $R'_p SiX'_{4-p}$ R'=phenyl
  X'=OH
Network Modifier
  60–70 mol % $R^2_m(R^3Y)_n SiX^2_{(4-m-n)}$
  R=γglycidoxypropyl or 3-methacryloxypropy
Network Former
  0–10 mol % $MR_4$
  M=Si, Zr
  R=methoxy, isopropoxy
Cross-linker
  without solvent
  reaction temperature 0°–100° C.

(ii) Hydrolysis/condensation of the pre-condensate
  in stoichiometric quantity of water
  reaction temperature 0°–100° C.
  reaction time 0.5–120 hours
Synthesis of Gdiphenyl
Description of synthesis for a 0.1 mol recipe

| | | |
|---|---|---|
| 16.54 g | (0.07 mol. 66.7 mol %) | Glymo(γglycidoxy-propyltrimeth-oxysilane) (Union Carbide Co.) |
| 7.57 g | 0.035 mol. 33.3 mol %) | diphenylsilanediol (ABCR Co.) |
| 3.15 g | (0.275 mol. stoichio.) | water |

In a three-necked flask equipped with a reflux condenser, thermometer and dropping funnel, the hydrosilicons are weighed in in the sequence indicated. The milky, cloudy reaction mixture is stirred for 18 hours at ambient temperature (magnetic stirrer). Within 60 minutes the suspension is heated up to about 90° C. with the aid of a mushroom heater or oil bath. The mixture becomes clear and (ii) a quarter of the stoichiometric quantity of water is added from the dropping funnel in one step without removing the heat-source. The resultant suspension, whose temperature drops by about 3°–40° C. upon addition of the water, is stirred until it clears (about 2 min.), then the remaining water is added in quarter portions at intervals of 20 minutes. The reaction mixture is kept at 80°–85° C. After the paint has clarified after the last addition of water, (after about 15 min.), the solution is heated for a further 90 min. (temperature about 82° C.), the heat-source is removed, the paint is slowly cooled to ambient temperature and is stirred for a further 18 hours at ambient temperature.

For storage, the gdiphenyl paint is diluted to 1:2 (% weight) with butoxyethanol. The viscosity of this solution lies at 5.64 mm$^2$/s (determined by Ubbelohde capillary viscosimeter at 20° C.).
Application of Gdiphenyl When used as a two-coating system (identified herein by designation OR16), the gdiphenyl pain is mixed as follows:

42.0 g of a gdiphenyl solution diluted to 1:2 (weight %) with butoxyethanol is further diluted with 28.0 g butoxyethanol (resultant dilution 1:4% by weight), and mixed with 1.199 g N-2-aminoethyl-3-aminopropyltriethoxysilane (DAMO, 15 mol % calculated on GLYMO). This solution is applied with a spray gun (SATA-jet, compressed air at 2 bar) to the bronze surface (e.g. is degreased with acetone or cleaned with water) until a visible wet effect appears. The resultant coating (drying time at ambient temperature about 16 hours) has, for a single application, a coating thickness of about 4 μm (measurement of coating thickness on uncorroded, rolled bronze plates; inductive method).

For a two-coating protective system, after a drying time of 16 hours a solution of Paraloid B72 (dilution 1:12% by weight, with solution mixture toluol/butoxyethanol 3.6:1) is applied as a second coating by the same application technique. The coating thickness of the two-coating system lies at 10 μm.

When used as a one-coating protective system (identified herein by the designation OR1) the gdiphenyl paint is mixed as follows:

13.8 g of a gdiphenyl solution diluted to 1:2 (weight %) with butoxyethanol is further diluted with 23.0 g butoxyethanol (resultant dilution 1:6% by weight), then mixed with 3.45 g of a solution of Paraloid B72 in acetic ether (1:2% by weight. Paraloid content: 20% by weight calculated on the paint according to the invention), and mixed with 0.394 g N-2-aminoethyl-3-aminopropyltriethoxysilane (DAMO). This solution is applied with a spray gun (SATA-jet, compressed air 2 bar) to the bronze surface (e.g. degreased with acetone or cleaned with water) until a visible wet effect appears. The resultant coating (overall drying time at ambient temperature about 16 hours) has for a single application a coating thickness of about 3 µm, and for a double application (intermediate drying about 3.5 hours) of about 6 µm (measurement of coating thickness on uncorroded, rolled bronze plates, inductive method).

The present application claims the priority under 35 U.S.C. § 119 of German Patent Application No. 195 30 836.0 filed Aug. 22, 1995, the disclosure of which is expressly incorporated by reference herein in its entirety.

We claim:

1. A method of producing a corrosion-protective coating on an article of or containing bronze, in which at least one protective coating is applied to the surface of the article, wherein:

the protective coating contains a polycondensation product;

the polycondensation product is incorporated in an organic solvent with a dilution ratio of condensation product to solvent, in percent by weight, of 1:0.1 to 1:10, thereby forming a solution; and the solution is applied to the article in the form of at least one coating, with a coating thickness of 0.5 to 20 µm per coating;

the polycondensation product being produced by:

(a) precondensation of 30 to 40 mol % of a noncrosslinkable organofunctional hydrosilicon with 60 to 70 mol % of a crosslinkable organofunctional hydrosilicon, at a reaction temperature of from 0° to 100° C. without externally added solvent, to form a precondensate:

(1) the noncrosslinkable organofunctional hydrosilicon having the formula:

wherein:

$R^1$ is aryl;

$X^1$ is selected from the group consisting of OH, Cl, and alkoxy; and p is 1 to 3; and (2) the crosslinkable organofunctional hydrosilicon having the formula:

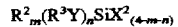

wherein:

$R^2$ is selected from the group consisting of alkyl, alkenyl, aryl, alkylaryl, arylalkyl, alkenylaryl, and arylalkenyl;

$R^3$ is selected from the group consisting of alkylene, alkenylene, arylene, alkylarylene, arylalkylene, alkenylarylene, and arylalkenylene;

$R^2$ and $R^3$ can be interrupted by —O—, —S—, or —NH—;

$X^2$ is selected from the group consisting of H, halogen, hydroxy, alkoxy, acyloxy, and $NR^4$, where $R^4$ is H or alkyl;

Y is a polymerizable group; and m and n are whole numbers from 0 to 3, with m+n=1 to 3; and (b) hydrolytic condensation of the precondensate with a stoichiometric quantity of water, at a reaction temperature of 0° to 100° C., for a reaction time of 0.5 to 120 hours, to form the polycondensation product.

2. The method of claim 1 wherein:

(a) $R^2$ is 3-glycidoxypropyl; and (b) an amine-based hardener, in an amount of 0.1 to 50 mol % with respect to the polycondensation product, is incorporated in the organic solvent.

3. The method of claim 1 wherein the precondensation is conducted at about 90° C.

4. The method of claim 1 wherein up to 10 mol % of a crosslinking agent is added during at least one of the precondensation and the hydrolytic condensation, the crosslinking agent having the formula:

$$MR^5$$

wherein:

M is selected from the group consisting of Si, Zr, and Al, and $R^5$ is alkoxy.

5. The method of claim 4 wherein $R^5$ is selected from the group consisting of methoxy and isopropoxy.

6. The method of claim 1 wherein an organic oligomer is incorporated in the organic solvent.

7. The method of claim 6 wherein the organic oligomer is a copolymer of ethylene methacrylate and methyl acrylate, at a dilution of 1:20 to 1:10% by weight, with a solvent mixture of toluol and butoxyethanol.

8. The method of claim 1 wherein after the solution is applied to the article, at least one additional coating of an organic oligomer is applied.

9. The method of claim 8 wherein the organic oligomer is a copolymer of ethylene methacrylate and methyl acrylate, at a dilution of 1:20 to 1:10% by weight, with a solvent mixture of toluol and butoxyethanol.

10. The method of claim 1 wherein the noncrosslinkable organofunctional hydrosilicon comprises diphenylsilanediol.

11. The method of claim 1 wherein $R^2$ is selected from the group consisting of δglycidoxypropyl and 3-methacryloxypropyl.

12. The method of claim 1 wherein the crosslinkable organofunctional hydrosilicon is selected from the group consisting of δglycidoxypropyltrimethoxysilane and 3-methacryloxypropyltrimethoxysilane.

13. The method of claim 1 wherein a hardener selected from the group consisting of N-2-aminoethyl-3-aminopropyltriethoxysilane, aminopropyltriethoxysilane, and diethylenetetraamine is incorporated in the organic solvent.

14. The method of claim 1 wherein the at least one protective coating is hardened at ambient temperature.

* * * * *